US012559641B2

(12) United States Patent
Weber et al.

(10) Patent No.: US 12,559,641 B2
(45) Date of Patent: Feb. 24, 2026

(54) PRINTED APPLIANCE COMPONENT

(71) Applicant: SCHOTT AG, Mainz (DE)

(72) Inventors: Urban Weber, Weiler bei Bingen (DE); Inga Gheczy, Wiesbaden (DE); Jochen Drewke, Mainz (DE); Kevin Duval, Penetanguishene (CA); Lucas Alousis, Riesweiler (CA); Stephanie Mangold, Klein-Winternheim (DE)

(73) Assignee: SCHOTT AG, Mainz (DE)

( * ) Notice: Subject to any disclaimer, the term of this patent is extended or adjusted under 35 U.S.C. 154(b) by 1528 days.

(21) Appl. No.: 16/386,594

(22) Filed: Apr. 17, 2019

(65) Prior Publication Data

US 2019/0315991 A1 Oct. 17, 2019

(30) Foreign Application Priority Data

Apr. 17, 2018 (DE) ..................... 10 2018 109 102.8

(51) Int. Cl.
*C09D 11/54* (2014.01)
*B32B 17/10* (2006.01)
(Continued)

(52) U.S. Cl.
CPC .............. *C09D 11/54* (2013.01); *B32B 17/10* (2013.01); *B41M 5/0017* (2013.01);
(Continued)

(58) Field of Classification Search
None
See application file for complete search history.

(56) References Cited

U.S. PATENT DOCUMENTS 6,136,382 A * 10/2000 Kamen ............... C03C 17/3405 427/515
10,434,818 B2 * 10/2019 O'Ryan ............ B32B 17/10256
(Continued)

FOREIGN PATENT DOCUMENTS

CN 1290281 4/2001
CN 1644637 7/2005
(Continued)

OTHER PUBLICATIONS

English machine translation CN103105676 (2013).*
(Continued)

*Primary Examiner* — Vivian Chen
(74) *Attorney, Agent, or Firm* — Ruggiero McAllister & McMahon LLC

(57) ABSTRACT

A method for producing an appliance component is provided. The appliance component has an operational front side and back side and has a substrate made of thermally tempered flat glass with a coating. The method includes the steprs of: a) providing a glass substrate made of thermally tempered glass with the dimensions of the appliance component; b) applying a preparation for producing an adhesion promoter layer onto a surface of the glass substrate, wherein the preparation is applied onto the surface of the glass substrate that forms the operational back side of the decorative panel; c) producing the adhesion promoter layer by polymerization of the preparation applied in step b); d) applying a preparation for producing an organic color layer onto the adhesion promoter layer produced in step c) by digital printing; and e) producing the organic color layer by polymerization of the preparation applied in step d).

13 Claims, 5 Drawing Sheets

(51) Int. Cl.

| | |
|---|---|
| ***B41M 1/34*** | (2006.01) |
| ***B41M 5/00*** | (2006.01) |
| ***C03C 17/30*** | (2006.01) |
| ***C03C 17/32*** | (2006.01) |
| ***C03C 17/34*** | (2006.01) |
| ***C09D 5/00*** | (2006.01) |
| ***C09D 7/40*** | (2018.01) |
| ***C09D 11/037*** | (2014.01) |
| ***C09D 11/102*** | (2014.01) |
| ***C09D 11/107*** | (2014.01) |
| ***C09D 11/108*** | (2014.01) |
| ***C09D 11/322*** | (2014.01) |
| ***C09D 11/38*** | (2014.01) |
| ***C09D 11/40*** | (2014.01) |
| ***C09D 125/08*** | (2006.01) |
| ***C09D 125/14*** | (2006.01) |
| ***C09D 133/06*** | (2006.01) |
| ***C09D 183/08*** | (2006.01) |

(52) U.S. Cl.

CPC .......... *B41M 5/0047* (2013.01); *B41M 5/007* (2013.01); *C03C 17/30* (2013.01); *C03C 17/32* (2013.01); *C09D 11/037* (2013.01); *C09D 11/102* (2013.01); *C09D 11/107* (2013.01); *C09D 11/108* (2013.01); *C09D 11/322* (2013.01); *C09D 11/38* (2013.01); *B41M 1/34* (2013.01); *C03C 17/34* (2013.01); *C03C 17/3405* (2013.01); *C03C 2217/445* (2013.01); *C03C 2217/485* (2013.01); *C03C 2217/72* (2013.01); *C03C 2218/10* (2013.01); *C03C 2218/112* (2013.01); *C03C 2218/119* (2013.01); *C09D 5/002* (2013.01); *C09D 7/40* (2018.01); *C09D 11/40* (2013.01); *C09D 125/08* (2013.01); *C09D 125/14* (2013.01); *C09D 133/06* (2013.01); *C09D 133/062* (2013.01); *C09D 183/08* (2013.01); *Y10T 428/24901* (2015.01); *Y10T 428/24926* (2015.01)

(56) References Cited

U.S. PATENT DOCUMENTS

| | | | | |
|---|---|---|---|---|
| 10,933,685 | B2 * | 3/2021 | O'Ryan | F24C 15/04 |
| 2002/0128351 | A1 * | 9/2002 | Kiguchi | C09D 11/36 523/161 |
| 2003/0021961 | A1 * | 1/2003 | Ylitalo | B41M 5/0011 428/195.1 |
| 2003/0069329 | A1 * | 4/2003 | Kubota | B41J 11/0015 523/160 |
| 2004/0097658 | A1 * | 5/2004 | Everaerts | C08F 297/026 525/299 |
| 2005/0152125 | A1 | 7/2005 | Fukuda | |
| 2006/0093797 | A1 * | 5/2006 | Sawatsky | B41F 17/006 428/195.1 |
| 2008/0069949 | A1 * | 3/2008 | Glockner | C09D 151/06 427/407.1 |
| 2008/0206504 | A1 * | 8/2008 | Hayes | B32B 17/10247 156/182 |
| 2009/0304948 | A1 * | 12/2009 | Witter | C03C 17/42 523/160 |
| 2010/0103355 | A1 * | 4/2010 | Sakamoto | G02F 1/133509 428/1.31 |
| 2010/0119705 | A1 * | 5/2010 | Roche | C08G 18/4833 427/164 |
| 2011/0008547 | A1 | 1/2011 | Grant | |
| 2011/0126578 | A1 * | 6/2011 | Kim | F25D 23/02 62/449 |
| 2011/0143047 | A1 * | 6/2011 | Kappaun | C09D 11/03 524/265 |
| 2011/0249056 | A1 | 10/2011 | Weingartner | |
| 2012/0021193 | A1 * | 1/2012 | Lecolley | B41M 5/508 428/210 |
| 2012/0090246 | A1 * | 4/2012 | Nunez-Regueiro | C03C 17/36 49/484.1 |
| 2012/0197026 | A1 * | 8/2012 | Maeda | C07D 209/12 548/455 |
| 2013/0008318 | A1 * | 1/2013 | McPherson | A47J 36/36 99/341 |
| 2013/0034702 | A1 * | 2/2013 | Bockmeyer | C09D 183/04 524/588 |
| 2013/0323477 | A1 * | 12/2013 | Depauw et al. | |
| 2014/0146538 | A1 * | 5/2014 | Zenker | B25H 3/003 362/293 |
| 2014/0357468 | A1 * | 12/2014 | Siebers | C03C 3/095 501/32 |
| 2015/0225285 | A1 * | 8/2015 | Domey | C03C 17/34 347/20 |
| 2015/0267079 | A1 * | 9/2015 | Bockmeyer | C03C 1/008 428/417 |
| 2016/0145465 | A1 | 5/2016 | Furutaka | |
| 2016/0200625 | A1 * | 7/2016 | Miyasaka | C03C 3/085 428/141 |
| 2016/0297222 | A1 * | 10/2016 | Allington | B41M 7/0081 |
| 2017/0001906 | A1 * | 1/2017 | Karagoz et al. | |
| 2017/0031480 | A1 | 2/2017 | Gabriel | |
| 2017/0342282 | A1 | 11/2017 | Torfs | |
| 2018/0112906 | A1 * | 4/2018 | Yi | F25D 21/04 |
| 2022/0227664 | A1 * | 7/2022 | Lambricht | C03C 17/32 |

FOREIGN PATENT DOCUMENTS

| | | | | |
|---|---|---|---|---|
| CN | 101362917 | B | * | 8/2011 |
| CN | 102390191 | | | 3/2012 |
| CN | 103105676 | | * | 5/2013 |
| CN | 104936775 | | | 9/2015 |
| CN | 105584245 | | | 5/2016 |
| DE | 102016113162 | | | 2/2017 |
| DE | 102016111162 | | | 12/2017 |
| EP | 3034312 | | | 6/2016 |
| EP | 3034312 | A1 | * | 6/2016 |
| IT | MI20091870 | | | 4/2011 |
| JP | 2002502201 | | * | 1/2002 |
| WO | 9850317 | | | 11/1998 |

OTHER PUBLICATIONS

English machine translation CN101362917 (2011).*

JP2002-502201 English machine translation (2002).*

Arkles, B. "Tailoring Surfaces with Silanes". Chemtech, Dec. 1977, vol. 7, pp. 766-778. (1977) (Year: 1977).*

* cited by examiner

PRINTED APPLIANCE COMPONENT

CROSS REFERENCE TO RELATED APPLICATIONS

This application claims benefit under 35 USC § 119 of German Application 10 2018 109 102.8 filed Apr. 17, 2018, the entire contents of which are incorporated herein by reference.

This application also incorporates by reference the entire contents of each of German Application 10 2016 014 143.3, German Application 10 2016 014 469.6, U.S. Application 62/411,234 filed on Oct. 21, 2016, U.S. Application 62/411,215 filed on Oct. 21, 2016, U.S. application Ser. No. 15/789,009 filed on Oct. 20, 2017, U.S. application Ser. No. 15/789,056 filed on Oct. 20, 2017, and U.S. application Ser. No. 16/277,238 filed on Feb. 15, 2019.

BACKGROUND

1. Field of the Invention

In general, the invention relates to glass articles as components for household appliances. In particular, the invention relates to glass articles in the form of appliance components of electrical appliances, in particular in the form of a panel, for example, an operating panel or a decorative panel for household appliances, as well as a method for producing a corresponding panel.

2. Description of Related Art

Appliance components are known from the prior art, for which a coating is applied on the glass surface by means of screen printing. In fact, coatings applied by means of screen printing display a good mechanical and chemical stability; nevertheless, coating technology by screen printing has several disadvantages.

Therefore, first of all, for each design to be printed, the corresponding screen needs to be produced in a costly manner. This is only feasible or profitable when producing more than a specific number of units of printed appliance components. Household appliances, however, are being fabricated in increasingly smaller series, in which screen printing is not profitable from an economic point of view.

In addition, in screen printing, for each color to be printed, a corresponding screen must be produced. In this case, each color is applied in a separate manufacturing step, and each applied layer must be thermally treated prior to another application. Therefore, the number of color hues is limited in the case of a coating applied by screen printing.

Another disadvantage of an imprint by screen printing lies in its limited resolution. Thus, the resolution to be obtained in screen printing is limited by the mesh size of the screen.

SUMMARY

In the sense of the invention, an appliance component here is to be understood, in particular, as a component of the appliance housing. Typically, in the sense of the present invention, appliance components are panels, for example, as part of the outer housing cover of the particular electronic appliance. Appliance components, in this case, as constituents of the appliance housing, are important with respect to technical functions, such as, for example, shielding the inside of the appliance from external influences, reflecting or absorbing electromagnetic radiation from the inside of the appliance, as well as with respect to increasing user friendliness for the user, for example, by a simplified cleaning of the appliance. At the same time, the appliance components need to fulfill a decorative function, such as, for example, having a specific design, or optically masking the technical components on the inside of the appliance.

In particular, the above applies to operating panels and/or decorative panels of household appliances, such as, for example, stoves, ovens, washing machines, microwaves or dishwashers. Based on the pattern of optical phenomena and also the advantageous mechanical and chemical properties, operating panels and decorative panels made of flat glass have been particularly employed here. A large proportion of the desired functions, however, can be achieved only with the help of a coating and/or a print on the glass surface.

At the same time, high requirements are placed on the mechanical and chemical stability of the coating or of the print. Thus, depending on the application in each case, coatings and prints must have a high resistance to high temperatures, mechanical influences, as well as also against chemical attacks by cleaning agents or water vapor. The adhesion of the coating or of the print on the glass surface is thereby of decisive importance for the functionality as well as the pattern of optical phenomena of the appliance component over the entire service life of the appliance.

Therefore, an object of the invention is to provide a method with which a multi-colored coating having high chemical and mechanical stability as well as high resolution can be applied onto a glassy flat glass, and thus a corresponding appliance component can be obtained, even in the case of producing a small number of units. Another object consists in providing a printed appliance component made of flat glass.

The invention relates to a method for producing an appliance component with an operational front side and back side for a household appliance, in particular an electrical or electronic household appliance, and comprises at least the following method steps: a) providing a glass substrate made of thermally tempered glass with the dimensions of the appliance component; b) applying a preparation for producing an adhesion promoter layer onto a surface of the glass substrate; c) producing the adhesion promoter layer by at least partial polymerization of the preparation applied in step b); d) applying a preparation for producing an organic color layer onto the adhesion promoter layer produced in step c) by digital printing; and e) producing the organic color layer by polymerization of the preparation applied in step d).

The glass substrate provided in step a) is a hardened flat glass, preferably a thermally tempered flat glass and has two surfaces. In step b), the preparation for producing the adhesion promoter layer is applied only onto one surface of the glass substrate, whereby the surface of the glass substrate, onto which the preparation is applied, forms the operational back side of the appliance component to be produced. The operational back side in this case is understood as the surface of the appliance component that faces the inside compartment of the appliance. Correspondingly, the operational front side is understood to be the surface of the appliance component that faces the user.

Preferably, the glass provided in step a) is a thermally tempered soda-lime glass. In particular, the glass comprises the following constituents in wt. %:

| | |
|---|---|
| $SiO_2$ | 70 to 76 wt. % |
| $Na_2O$ | 11 to 17 wt. % |
| CaO | 8 to 16 wt. % |

Likewise, a glass ceramic can also be used as the substrate, as it is usually also employed for glass-ceramic cooktops. It may involve, for example, a lithium-aluminum silicate glass ceramic, which does not have volume coloring and has a transparency similar to a pane of glass.

The preparation applied in step b) comprises polymerizable monomers, whereby at least a portion of the monomers has at least one functional group that can enter into a bond with the glass surface of the substrate. In step c), the adhesion promoter layer is produced by at least partial polymerization of the preparation applied in step b). In this case, the polymerization particularly leads to a crosslinking of the monomers with the formation of carbon-carbon bonds or with the formation of silicon-oxygen bonds.

According to one variant, the crosslinking of the monomers with the formation of carbon-carbon bonds takes place by radical polymerization in step c). Here, the crosslinking is a comparatively rapid process. In contrast to layers that are applied by means of screen printing and subsequently are burned in at high temperatures, the coated substrate need not be heated during or after step c). This is advantageous, first of all, since the energy necessary for heating can be saved and the coating process takes less time. Another advantage of the method according to the invention lies in the fact that, due to the essentially lower temperatures of the glass substrate in comparison to a screen printing process, a thermal tempering of the glass is not adversely affected. Therefore, in the method according to the invention, thermally tempered flat glasses are preferably employed as the substrate. The coloring layer produced in the steps d) and e) also has corresponding advantages.

The radical polymerization is preferably photo-induced. According to one embodiment of the invention, the preparation applied in step b) and/or the one applied in step e) comprises a photoinitiator. The following have proven to be particularly advantageous here as photoinitiators: triphenylphosphine oxide, diphenylphosphine oxide, 2-methyl-4'-(methylthio)-2-morpholinopropiophenone, [4-[(4-methylphenyl)thio]phenyl]phenyl-; 4-(4-methylphenylthio) benzophenone, 2,4,6-trimethylbenzoyl diphenylphosphine oxide and 2,2',4',6'-tetramethylpropiophenone.

One embodiment provides that the preparation applied in step b) and/or the one applied in step d) comprises 2 to 18 wt. % photoinitiator. A rapid polymerization is assured thereby. The degree of crosslinking can simultaneously be adjusted via the content of the photoinitiator in the preparation.

Alternatively or additionally, the preparation applied in step b) contains a compound for suppressing oxygen inhibition, preferably an antioxidant or a radical scavenger. A termination of the polymerization reaction due to the incorporation of oxygen can be avoided thereby, without the need for conducting the polymerization under protective gas.

According to a variant of the invention, the preparation applied in step b) has at least one monomer containing vinyl and/or acrylic groups as radically polymerizable groups. The layer resulting therefrom or the polymer resulting therefrom is transparent and preferably has a slight intrinsic coloring. This is advantageous, since the adhesion promoter layer obtained in step c) is applied onto the substrate as the lowermost layer, and the coated side of the substrate later forms the operational back side of the appliance component in the appliance. Thus, the adhesion promoter layer produced in step c) lies between the glass substrate and the color layer produced in step e), and when the appliance component is installed in the particular appliance, the user looks through the glass and the adhesion promoter layer onto the coloring layer. An opacity or an intrinsic coloring of the adhesion promoter layer would accordingly act as a disadvantage on the pattern of optical phenomena of the coloring layer and therefore should be avoided. A preferred embodiment of the invention thus provides that, in the case of a layer thickness of 5 μm+/−1 μm, the transmittance of the adhesion promoter layer for the visible region of the light, in particular for light with a wavelength in the range of 380 to 780 nm amounts to at least 80%, preferably at least 95% for a layer thickness of 1-5 μm. Alternatively or additionally, the adhesion promoter layer in this embodiment has a mean color coordinate shift ΔE of less than 10, preferably of less than 5. In this case, the mean color coordinate shift is to be understood as an average color coordinate shift that was averaged over the color coordinate shifts ΔE for all wavelengths in the visible region of the light, in particular for light with a wavelength in the range of 380 nm to 780 nm. According to one embodiment of the invention, the color coordinate shift ΔE is dependent on the particular wavelength or the particular color, wherein the color coordinate shift ΔE decreases with increasing wavelength of the color. In particular, the adhesion promoter layer has a color coordinate shift ΔE for the color blue of <15, preferably <10; for the color red of <5, preferably <2; and for the color green of <6, preferably <4.

Vinyls and acrylates with a plurality of different functionalities are also obtained. Thus, for example, the degree of crosslinking by way of the use of multifunctional acrylates, i.e., of acrylates with a plurality of acrylic groups per Monomer unit, can be adjusted. The use of monomers from the group containing the constituents acrylic acid isobornyl ester (isobornyl acrylate), 5-hexenoic acid, benzyl acrylate, (tetrahydro-2-furanyl)methyl-2-propenoate has also proven to be particularly advantageous.

Preferably, the preparation applied in step b) comprises at least one monomer having an acidic group for binding to the surface of the glass substrate. Also, the polymer produced in step c) or the layer produced in step c) comprises here a covalent bonding to the glass surface, so that the layer produced in step c) displays a strong adhesion to the substrate. At the same time, the layer produced in step c) comprises an organic polymer, so that a good adherence exists between the layer produced in step c) and the layer produced in step e). Accordingly, the layer deposited in step c) functions as an adhesion promoter layer.

According to an enhancement of the invention, the preparation applied in step b) for the production of the adhesion promoter layer contains at least two different acrylates as monomers, wherein at least one of the monomers has an aromatic group.

I

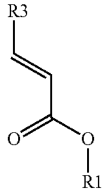

-continued

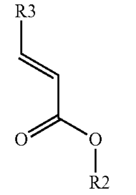

II

Wherein R1 is an aromatic or aliphatic residue and R2 is an aromatic residue. R3 can be a methyl group or hydrogen. If acrylates with aromatic residues are incorporated into the polymer, then the latter has a smaller polymerization shrinkage. In this case, a smaller polymerization shrinkage is advantageous, since fewer tensile forces form in the layer. Layers with small tensile forces are advantageous in this case, since such layers, when compared with corresponding layers having high tensile forces, have a better adhesion of the adhesion promoter layer to the glass surface as well as a better adhesion of the coloring layer on the adhesion promoter layer. Alternatively or additionally, the preparation applied in step b) comprises a monomer I with a sterically demanding aliphatic residue. Preferably, R1 is therefore a cyclic aliphatic residue, in particular an isobornyl residue or a tetrahydrofuranyl residue. Analogously to aromatic residues, sterically demanding aliphatic residues also lead to a reduction in the polymerization shrinkage. According to one embodiment of the invention, the percentage of monomers with an aromatic residue is 20 to 70 wt. %, preferably 40 to 60 wt. %.

In a preferred embodiment of the invention, the preparation applied in step b) contains the following constituents:

| | Percentage in wt.% |
|---|---|
| Reactive diluent | 30 to 90, preferably 50 to 75 |
| Monomer with acid function | 5 to 15 |
| Photoinitiator | 5 to 20, preferably 10 to 18 |
| Radical scavenger | 0 to 3 |

According to a preferred embodiment, the preparation applied in step b) contains the following constituents:

| | Percentage in wt. % |
|---|---|
| Acrylic acid isobornyl ester, IBA | 46.10% |
| 5-Hexenoic acid | 10.40% |
| Benzyl acrylate | 17.40% |
| CN131B from Sartomer USA, LLC | 11.10% |
| Triphenylphosphine oxide | 2.50% |
| 2-Hydroxy-3-phenoxypropyl acrylate | 8.10% |
| Glycidyl phenyl ether | 0.80% |
| 3,4-bis-2-methoxyethylidene-2,4-hexadione | 2.40% |
| Butylhydroxytoluene | 0.80% |
| 2,2'-Methylenebis(4-methyl-6-tert-butylphenol) | 0.40% |

Another variant of the invention provides that the preparation applied in step b) contains as monomers at least one silane, a silsesquioxane or a prehydrolysate of a silane. According to this variant, the polymerization of the preparation is produced in step c) by a hydrolysis reaction with the formation of silicon-oxygen bonds. In this case, the layer formed in step c) adheres particularly well to the glass surface due to the silane functionalities. Due to the organic residues of silanes or silsesquioxanes, the adhesion promoter layer formed in step c) ensures a good adhesion of the coloring layer. In this case, a preparation containing silanes with polymerizable groups, in particular containing trialkoxysilanes with polymerizable groups, has proven to be particularly advantageous. Acrylic groups, methacrylic groups, or vinyl groups have proven to be especially advantageous as polymerizable groups. In this case, the polymers containing a Si—O linkage formed during the hydrolysis of silanes are crosslinked with one another by the polymerizable groups of the organic residue. In particular, the preparation applied in step b) contains silanes from the group containing the constituents: 3-methacryloxypropyltriethoxysilane, triethoxyvinylsilane, 3-methacryloxypropyltrimethoxysilane and trimethoxyvinylsilane Si(OR)4, SiR(OR)3 and/or Si2 (OR)6, wherein, preferably, OR=alkoxy, such as, preferably, methoxy, ethoxy, n-propoxy, i-propoxy, butoxy, isopropoxyethoxy, methoxypropoxy, phenoxy, acetoxy, propionyloxy, ethanolamine, diethanolamine, triethanolamine, methacryloxypropyloxy, glycidylpropyloxy, acrylate, methylacrylate, acetylacetone, ethyl acetate acetic ester, ethoxyacetate, methoxyacetate, methoxyethoxyacetate or methoxyethoxyethoxyacetate or mixtures thereof. In particular embodiments, R is preferably a methyl, ethyl, n-propyl, butyl, allyl, vinyl, aminopropyl, and/or fluorooctyl residue. X is preferably Cl, Br, F, or a mixture of these.

An embodiment of these variants provides that the composition applied in step b) comprises the following constituents:

| | Percentage in wt. % |
|---|---|
| Solvent | 70 to 95, preferably 80 to 95 |
| Triethoxysilane containing polymerizable groups | 2 to 10, preferably 3 to 8 |

Alcohols such as ethanol, methanol, 2-propanol or ether, for example, dipropylene glycol monomethyl ether are used as solvents.

According to another embodiment, the preparation applied in step b) comprises colloidal silica, solvent, water, as well as a trialkoxysilane containing a radically polymerizable group. In particular, the preparation contains 50 to 90 wt. % solvent, for example ethanol, 1 to 5 wt. % silica, as well as less than 15 wt. % water, and 0.1 to 2 wt. % of a vinylsilane.

The preparation for producing the adhesion promoter layer can be applied onto the glass substrate in step b) particularly by means of digital printing, spraying, wiping, or doctor blading the preparation, or by means of screen printing.

In the sense of the invention, a digital printing method is understood to be a printing method in which printing templates present in electronic form are applied onto the substrate to be printed without the use of a physical printing plate, such as a screen or a stencil. Printing methods such as ink-jet printing methods, laser printing methods, or aerosol-jet printing methods are digital printing methods.

In this case, the preparation in step b) can be applied onto the glass substrate over the entire surface. It is also possible, however, to apply the preparation in a laterally structured manner, i.e., only on partial regions of the glass substrate. This is an option, for example, when only partial regions of the flat glass are to be coated with a coloring layer, for example, if a window is to be left free for a display in the appliance component.

According to an enhancement of the invention, the application of the preparation for producing the adhesion promoter layer takes place in step b) onto a glass substrate, whose temperature is at least 50° C., preferably in the range of 50 to 100° C. In particular, the application of the preparation in step b) takes place directly after a thermal tempering of the glass substrate provided in step a). By applying the preparation for producing the adhesion promoter layer in step b) onto a heated glass pane, a preliminary crosslinking takes place, i.e., a partial hardening of the coating applied in step b) by thermal curing. This is first of all advantageous, since a crosslinking takes place within the coating applied in step b) without UV irradiation. In addition, an activation of the glass surface, which still further improves the adhesion of the adhesion promoter layer to the glass surface, takes place due to the thermal tempering. According to one embodiment of the invention, therefore, step b) takes place after less than 3 days, preferably after less than one day, and particularly preferred, after less than 3 hours after the thermal tempering of the substrate.

According to an enhancement of the invention, by the application of the preparation in step b) onto a hot glass surface, a preliminary crosslinking takes place, due to which the adhesion promoter layer will have a sufficiently high stability, so that even without additional crosslinking by means of UV irradiation in step d), the preparation for producing the coloring layer can be applied onto the adhesion promoter layer. In this embodiment of the invention, the hardening of the adhesion promoter layer takes place together with the coloring layer in step e). Due to the joint crosslinking, in this case, a still better adhesion between the adhesion promoter layer and the coloring layer can be achieved.

One embodiment of the invention provides that the flat glass provided in step a) is a so-called float glass. In this case, one side of such glasses came into contact with a tin bath during the production of the glass. The other side of the glass was in contact with the surrounding atmosphere during the production process. It has been demonstrated here that it is advantageous for the adhesion of the adhesion promoter layer to the glass surface, if the side of the glass that was in contact with the tin bath forms the operational front side of the appliance component.

In the case of the method according to the invention, the preparation applied in step d) contains radically polymerizable monomers and at least one colorant. The production of the coloring layer, which is also designated in the following as the organic color layer, takes place in step e) by radical polymerization of the monomers with the formation of carbon-carbon bonds.

The preparation for producing the coloring layer in this case is so stable, that it can be applied in step d) by means of digital printing, in particular by an ink-jet printing method. A polymerization thus takes place only after the deposition.

The application of the coloring layer by means of digital printing in this case is advantageous from several aspects. First of all, unlike in screen printing, a screen need not be produced, so that the method according to the invention is also profitable in series with a small number of units. In addition, with the aid of digital printing, coloring layers with different color hues can also be obtained. For this purpose, several preparations that differ due to the coloring materials contained therein are applied in one printing process. The resolution of the print is not limited here a mesh width, yet the number of applied color hues is limited by the multiple stages of the process. Instead, color hues can be obtained by mixing different preparations in the printhead.

The radical polymerization is preferably photo-induced. According to one embodiment of the invention, the preparation applied in step d) contains a photoinitiator. The following have proven to be particularly advantageous here as photoinitiators: triphenylphosphine oxide, diphenylphosphine oxide, 2-methyl-4'-(methylthio)-2-morpholinopropiophenone, [4-[(4-methylphenyl)thio]phenyl]phenyl-; 4-(4-methylphenylthio)benzophenone, 2,4,6-trimethylbenzoyl diphenylphosphine oxide and 2,2',4',6'-tetramethylpropiophenone. One embodiment provides that the preparation applied in step d) comprises 1 to 20 wt. %, preferably 10 to 18 wt. % of photoinitiator. A rapid polymerization is assured thereby. The degree of crosslinking can simultaneously be adjusted via the amount of photoinitiator in the preparation.

Alternatively or additionally, the preparation applied in step d) contains a compound for suppressing oxygen inhibition, preferably an antioxidant or a radical scavenger. A termination of the polymerization reaction due to the incorporation of oxygen can be avoided thereby, without the need for conducting the polymerization under protective gas.

In contrast to layers that are applied by means of screen printing and subsequently are burned in at high temperatures, the coated substrate need not be heated in step d). In addition to the advantages already described above, the method according to the invention thus also offers the possibility of employing colorants with a smaller temperature stability. In this case, one embodiment of the invention provides that the preparation applied in step d) contains organic colorants. According to one embodiment of the invention, the percentage of colorant in the preparation amounts to 1 to 10, preferably 2 to 4 wt. %. Preferably, the colorants used have a high photostability. In particular, the colorants used display a lightfastness according to DIN EN ISO 105-B02. In particular, colorants from the group containing the constituents benzimidazolones, bisacetoacetarylides, isoindolines, quinacridones and phthalocyanines are suitable.

In order to ensure the color stability of the color layer produced in step e) over the service life of the particular appliance, the preparation can contain a light stabilizer. HALS or aromatic compounds with extended π-systems can be used, for example, as light stabilizers. Hydroquinone, MEHQ and piperidine derivatives have proven to be particularly suitable light stabilizers.

According to one embodiment of the invention, the preparation applied in step d) for producing the organic color layer contains acrylates as monomers. Preferably, the preparation contains a reactive diluent and at least one difunctional acrylate, preferably at least one trifunctional acrylate. The viscosity can be adjusted by the reactive diluent, so that a printable preparation can be obtained. Since the reactive diluent is also polymerized in step e), and thus a covalent crosslinked constituent of the polymer matrix of the coloring layer is polymerized, the polymerization shrinkage is relatively small, which has a favorable effect on the tensile stress in the layer. In addition, no solvent needs to be removed after the polymerization.

In this case, a good crosslinking of the polymer is ensured by the use of at least difunctional, or in fact, at least trifunctional, acrylates in the preparation. The following multifunctional acrylates have proven to be particularly advantageous here: dipentyl erythritol hexaacrylate and/or diacrylates, such as Sartomer 44, for example. In particular, the preparation applied in step d) contains 1,6-hexanediol diacrylate, tetrahydro-2-furanylmethyl-2-propenoate, 1-mesityl-2-methyl-1-propanone, dipentyl erythritol hexaacrylate.

One embodiment of the invention provides that steps d) and e) are conducted several times. A plurality of color layers are applied thereby. For example, the color intensity can be increased in this way, or color effects can be achieved by overlaying a plurality of color layers. Preferably, steps d) and e) are conducted twice, and particularly preferred, 3 times.

An enhancement of the invention provides that in a step f) that follows step e), a cover layer is applied onto the coloring layer. The cover layer can be applied, for example, by screen printing, digital printing, wiping, or doctor blading. Preferably, the cover layer is applied onto the entire color layer and is opaque. The cover layer can also be laterally structured thereby, i.e., individual regions of the surface of the appliance component can be left free.

By the application of a bright or light cover layer, first of all, the color intensity of the color layer can be optically increased; at the same time, a view through the appliance component into the inside of the appliance is prevented. In addition, the color layer is sealed by the cover layer, which can be advantageous with respect to the chemical stability of the color layer.

Furthermore, the invention relates to an appliance component with operational front side and back side for a household appliance, the component comprising a substrate of tempered flat glass with a coating. The coating is arranged on the operational back side and comprises at least one adhesion promoter layer and at least one organic color layer. The organic color layer comprises a polymeric matrix and at least one colorant and is present as a digital print. The adhesion promoter layer comprises a polymeric matrix with functional groups for binding to the glass surface and is arranged between the glass substrate and the organic color layer.

According to one variant of the invention, the adhesion promoter layer comprises an organic polymer, preferably an organic polymer containing monomeric units of at least one monomer containing radically polymerizable groups. In particular, the polymer of the adhesion promoter layer contains monomer units that are formed by polymerization of monomers with vinyl and/or acrylic groups. The corresponding polymers have a high transparency as well as a small displacement of the color coordinates, in addition to a high temperature stability and high chemical and mechanical stability.

According to this variant of the invention, the polymer of the adhesion promoter layer has at least one monomer unit containing an acidic group for bonding to the surface of the glass substrate. Therefore, the adhesion promoter layer displays a high adhesion to the substrate. Simultaneously, the adhesion promoter layer comprises an organic polymer, so that a good adhesion prevails between the adhesion promoter layer and the color layer, which acts advantageously on the mechanical stability of the entire coating.

One embodiment of the invention provides that the adhesion promoter layer comprises a copolymer containing at least the following monomer units Ia and IIa and/or IIIa:

Ia

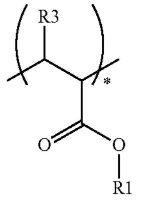

IIa

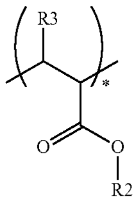

IIIa

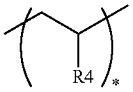

wherein R1 is an aromatic residue and R2 is an aliphatic residue or an aliphatic acid, and R3 is hydrogen or a methyl group. R4 is an aromatic or aliphatic residue. If monomer units containing aromatic residues or sterically demanding aliphatic residues are incorporated, then the polymer displays a smaller polymerization shrinkage.

According to one embodiment of the invention, the adhesion promoter layer contains a photoinitiator. Alternatively or additionally, the adhesion promoter layer may contain a compound for suppressing the oxygen inhibition, preferably an antioxidant or a radical scavenger.

In another variant of the invention, the polymer of the adhesion promoter layer is crosslinked by Si—O bonds. A corresponding polymer is accessible in this case by hydrolysis of a silane, a silsesquioxane or a pre-hydrolysate of a silane and contains corresponding monomer units. In particular, the adhesion promoter layer comprises a polymer with the monomer units IVa IVa

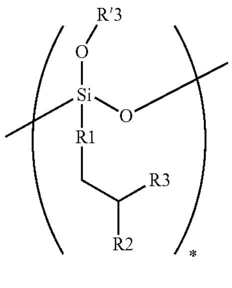

The residue R1 in this case is preferably an aliphatic or aromatic residue; for example, a crosslinking of the polymer can take place by C—C bonds via the residue R3, and by Si—O—Si bonds via the residue R'3. The residue R2 can be an aliphatic residue. In particular, the residue R2 is an aromatic or aliphatic ester.

At least one coloring layer is arranged above the adhesion promoter layer. The term "above" in this case refers to the sequence of layers starting from the glass substrate. Therefore, the adhesion promoter layer is arranged between the glass substrate and the coloring layer.

One embodiment of the invention provides that the coloring layer comprises a crosslinked polyacrylic matrix having at least one colorant embedded in the matrix. In particular, the coloring layer is present as a digital print having at least two different colorants, wherein laterally structured regions have different colorants.

Preferably, the coloring layer comprises at least one organic colorant; particularly preferred, at least one organic colorant is suitable from the group comprising the constituents: benzimidazolones, bisacetoacetarylides, isoindolines, quinacridones and phthalocyanines.

A large selection of different colorants is available due to the use of organic colorants. Since, unlike pigments, the colorants are also soluble in organic solvents and/or the reactive diluent employed for producing the coloring layer, there is no danger that the printing jets will be stopped up by undissolved particles during printing.

The colorants contained in the coloring layer preferably have a high photostability. Preferably, the colorants have a color stability according to DIN EN ISO 105-B02. This ensures a color stability of the coloring layer over the entire service life of the corresponding appliance. The color stability of the coloring layer in this case can be increased by addition of a light stabilizer. It has proven to be particularly advantageous if the color layer contains a HALS or aromatic compounds with extended Tc-systems.

According to another embodiment of the invention, the coating has at least an additional second coloring layer, preferably an additional third coloring layer. Alternatively or additionally, the coating has a cover layer as the uppermost layer. The cover layer in this case is formed, in particular, as an opaque and/or strongly scattering layer. A view through the appliance component into the interior of the appliance is thereby prevented. Preferably, the coating has an integral transmittance over the entire visible region of the light of at most 10%, preferably of at most 5%. A view through the appliance component into the interior of the appliance is thereby prevented.

According to one embodiment of the invention, the adhesion promoter layer and the coloring layer are crosslinked together with one another.

One embodiment of the invention provides that the adhesion promoter layer has a layer thickness in the range of 3 to 8 μm, preferably 4 to 6 μm; the coloring layer has a thickness in the range of 5 to 35 μm, preferably 7 to 28 μm; and/or the cover layer has a thickness in the range of 5 to 35 μm. In particular, coatings with the above-given layer thicknesses have a high mechanical stability.

A measure for the mechanical stability of the coatings as well as the adhesion of the coating onto the substrate is the force required to peel or delaminate the coating from the glass surface. In one embodiment of the invention, the force amounts to 3.5 to 5 N for coatings with one organic color layer; 5 to 7 N for coatings with two organic color layers; and 14 to 16 N for coatings with three organic color layers. The force required for delaminating the coating is determined with the aid of a scratching-tool Elcometer 3092 Sclerometer Hardness Tester with a round test tip made of tungsten carbide with a test tip radius of 1.0 mm according to the measurement standard AS 3894.4.

The coating is arranged on the operational back side of the appliance component. Therefore, the coating is protected from external mechanical influences by the flat glass. Preferably, the flat glass is thermally tempered. Due to the thermal tempering, the mechanical strength and scratch resistance of the glass is increased. In order to ensure a sufficient mechanical stability of the appliance component, one embodiment of the invention provides that the glass substrate has a thickness of at least 2 mm. Preferably, the glass substrate has a thickness in the range of 3 to 8 mm, and particularly preferred, a thickness in the range of 3.5 to 5.5 mm.

The coating can be applied onto the entire operational back side of the appliance component. It is also possible, however, that the coating is laterally structured, and only partial regions of the operational back side are provided with the coating. Thus, for example, displays can be arranged behind uncoated regions of the appliance component.

The appliance component according to the invention is preferably designed as a decorative or operating panel of a household appliance; in particular is a decorative or operating panel of a household appliance, or will be used as a decorative or operating panel of a household appliance.

BRIEF DESCRIPTION OF THE DRAWINGS

In the following, the invention will be explained in more detail on the basis of examples of embodiment as well as on the basis of FIGS. 1 to 11.

DETAILED DESCRIPTION

Figure 1:
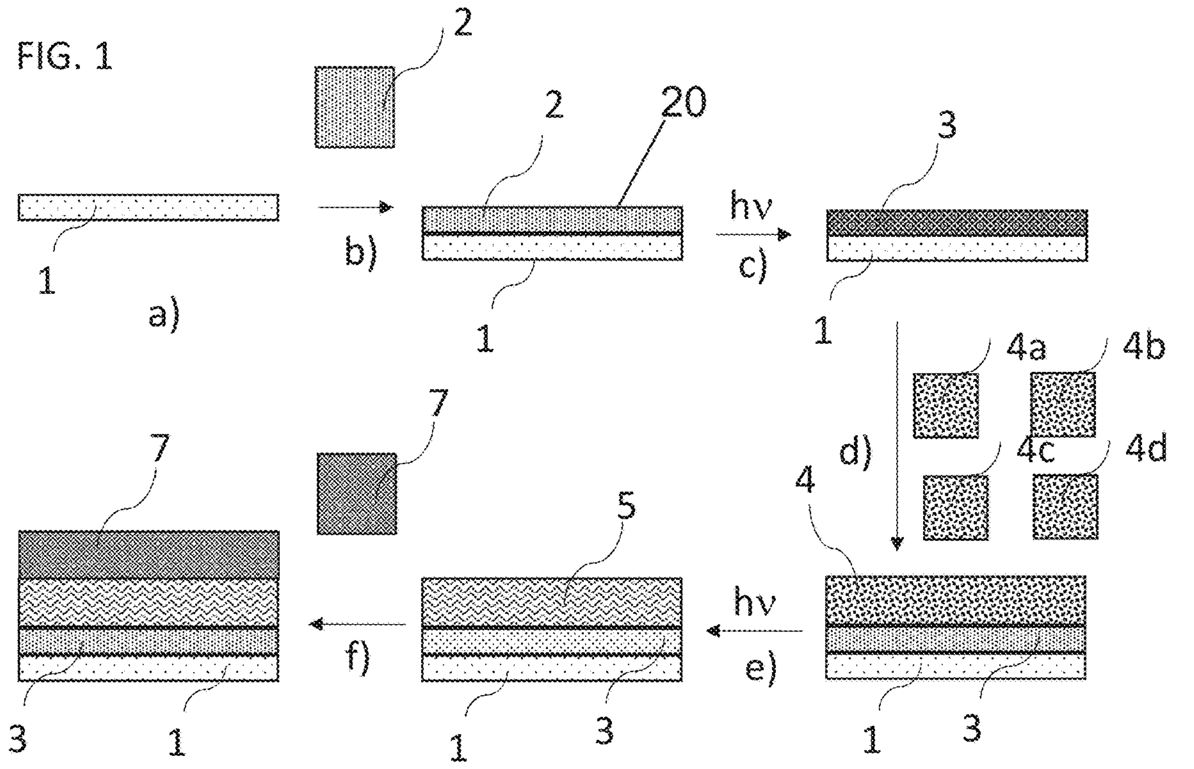
FIG. 1 shows a schematic representation of an embodiment of the production process according to the invention.

In FIG. 1, an embodiment of the method according to the invention is shown schematically. In step a), a thermally tempered flat glass 1 as well as a preparation 2 for producing the adhesion promoter layer are provided. The flat glass 1 serves as a substrate for the coating applied in the following method steps and has a thickness of at least 2.5 mm. According to a first exemplary embodiment, the preparation 2 contains at least the following components in wt. %:

| | |
|---|---|
| Acrylic acid isobornyl ester, IBA | 46.10% |
| 5-Hexenoic acid | 10.40% |
| Benzyl acrylate | 17.40% |
| CN131B from Sartomer USA, LLC | 11.10% |
| Triphenylphosphine oxide | 2.50% |
| 2-Hydroxy-3-phenoxypropyl acrylate | 8.10% |
| Glycidyl phenyl ether | 0.80% |
| 3,4-bis-2-methoxyethylidene-2,4-hexadione | 2.40% |
| Butylhydroxytoluene | 0.80% |
| 2,2'-Methylenebis (4-methyl-6-tert-butylphenol) | 0.40% |
| Total | 100.0% |

In step b), the preparation 2 is applied onto the surface of one side face of the flat glass 1. The side face of the flat glass 1, which is coated with the preparation 2, forms here the operational back side of the appliance component being produced. Correspondingly, the side face of the flat glass that forms the operational front side of the appliance component remains uncoated.

The viscosity of the preparation 2 can be adjusted via the percentage of reactive diluent as well as the percentage of oligomers with polymerizable groups. Since the preparation 2 of this exemplary embodiment contains a relatively high percentage of reactive diluents of more than 60 wt. %, the preparation 2 has a relatively low viscosity, so that it can be applied in step b) by employing a spraying method. The percentage of oligomers with polymerizable groups, also referred to as pre-polymers amounts to 11 wt. %.

In step c) a hardening by UV light of the layer 20 applied in step b) takes place. The preparation 2 in this case contains a photoinitiator. By irradiation with light having a wavelength of 200-450 nm, preferably 250-380 nm, therefore, a polymerization of the monomers takes place, leading to a crosslinking in the applied layer 20.

In the case of the preparation 2 of the first exemplary embodiment, the percentage of aromatic monomers amounts to 36 wt. %. Additionally, the preparation containing 46 wt. % acrylic acid isobornyl ester contains a high percentage of an aliphatic acrylate with a sterically demanding residue, so that the polymerization shrinkage occurring in step c) is small.

The preparation 2 contains a monomer that has an acid function in addition to a polymerizable group. This acid function is contained in the preparation in a percentage of 10 wt. % This acid functionality of the corresponding monomer forms a covalent compound with free hydroxy groups, so that a good adhesion of the monomer to the glass surface is ensured. Due to the polymerization of the monomers in step c), the incorporation of the corresponding monomers in the polymer of the adhesion promoter layer 3 leads to a good adhesion of the layer 3 to the surface of the glass substrate 1. This is shown schematically in FIG. 11. Thus, the polymer 30 of the adhesion promoter layer 3 is bonded covalently via carboxyl groups 31 to the glass surface 1.

In step d), the application of the preparations 4a, 4b, 4c and 4d is produced by an ink-jet printing method, wherein the preparations 4a to 4d differ by the colorants contained in them. The percentage of colorant in the preparations 4a to 4d lies in the range of 2.5 to 3 wt. %.

In order to produce the desired color hue for the particular print region, in this case, preparations 4a, 4b, 4c and 4d can be applied individually or in different mixing ratios. Since the preparations 4a to 4d differ essentially only with respect to the colorant contained in them; a mixing of the preparations 4a to 4d in the layer 4 is possible, independently of the particular mixing ratio. In this case, the particular mixing ratios at different local regions of the layer 4 are determined by the color hue to be obtained.

In one embodiment, hardening can be produced line by line or row by row at the printhead. Alternatively, hardening can take place after the application of the entire layer.

The preparations 4a to 4d contain the following components:

| | |
|---|---|
| Colorant | 1 to 5 wt. % |
| 1,6-hexanediol diacrylate | 20 to 33 wt. % |
| (Tetrahydro-2-furanyl)methyl 2-propenoate | 20 to 35 wt. % |
| Sartomer sr44 | 15 to 25 wt. % |
| Photoinitiator | 8 to 15 wt. % |
| 1-Mesityl-2-methyl-1-propanone | 0 to 20 wt. % |
| Dipentyl erythritol hexaacrylate | 10 to 25 wt. % |
| Oxygen inhibitor | <1 wt. % |

Due to the use of 1,6-hexanediol diacrylate as a difunctional reactive diluent, i.e., a reactive diluent with two polymerizable acrylic functionalities, the preparations 4a, 4b, 4c and 4d have low viscosities, so that the preparations 4a, 4b, 4c and 4d can be applied by means of ink-jet printing. At the same time, due to the difunctionality of the reactive diluent as well as by use of a hexafunctional acrylate in the preparations 4a, 4b, 4c and 4d in the polymerization occurring in step e), a high degree of crosslinking is ensured within the coloring layer 5. The coloring layer thus has a high mechanical stability.

In the exemplary embodiment shown in FIG. 1, after the hardening of the coloring layer 5 in steps f) and g), a cover layer 7 is applied. In this case, the cover layer 7 can be a coloring layer with a high percentage of pigment or colorant. Preferably, the cover layer contains a white pigment, for example TiO2. The percentage of pigment of the cover layer 7 in the exemplary embodiment is 15 wt. % in this case, and is thus essentially higher than the percentage of colorant in the coloring layer 5. The preparation 7 has the following composition in this case:

| | |
|---|---|
| 1,6-hexanediol diacrylate | 20 to 30 wt. % |
| (Tetrahydro-2-furanyl)methyl 2-propenoate | 15 to 25 wt. % |
| Sartomer sr44 | 15 to 25 wt. % |
| Diphenyl(2,4,6-trimethylbenzoyl) | 7 to 15 wt. % |
| Colorant or pigment | 10 to 20 wt. % |
| 1-Mesityl-2-methyl-1-propanone | 8 to 13 wt. % |

In this case, the preparation 7 can be applied with an ink-jet method or by means of a screen printing. In step g) the hardening of layer 70 to the cover layer 7 is produced by means of UV light.

In a second exemplary embodiment, a preparation 2 with the following composition is provided in step a):

| | |
|---|---|
| 2-Propanol | 5 to 10 wt. % |
| Dipropylene glycol monomethyl ether | 75 to 90 wt. % |
| Methanol | 1 to 5 wt. % |
| 3-Methacryloxypropyltriethoxysilane | 2 to 8 wt. % |

In the second exemplary embodiment, the hardening of the adhesion promoter layer 3 in step c) is produced by hydrolysis of the silanes, so that the monomer units of the polymer of the adhesion promoter layer 3 are linked together via Si—O bonds. The bonding of the adhesion promoter layer 3 to the surface of the glass substrate also takes place by way of Si—O bonds.

Figure 2:
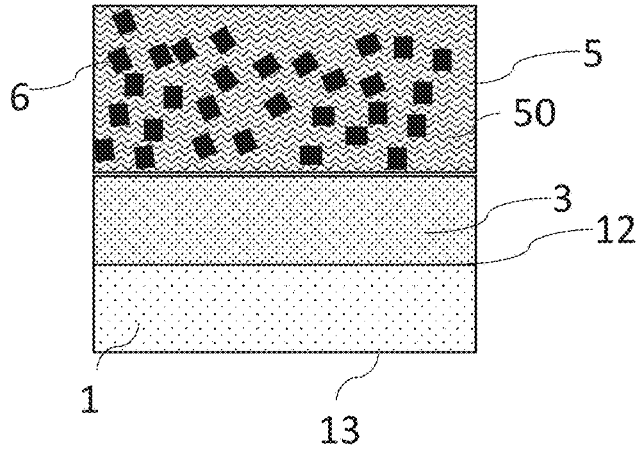
FIG. 2 shows a schematic representation of an embodiment of an excerpt from an appliance component according to the invention.

FIG. 2 shows a schematic representation of an excerpt of an appliance component in cross section. The adhesion promoter layer 3 in this case is applied onto the side face 12 of the flat glass 1, which forms the operational back side of the appliance component. The side face 13 of the flat glass 1 that forms the operational front side, in contrast, does not have a coating. The coloring layer 5 is arranged on the adhesion promoter layer 3 and comprises an organic polymer matrix 50 and a colorant 6 embedded therein. FIG. 2 shows here an exemplary embodiment with a monochromic coloring layer 5, i.e., the coloring layer 5 only has one colorant 6. The adhesion promoter layer 3 has a layer thickness of 4 to 5 μm.

Figure 3:
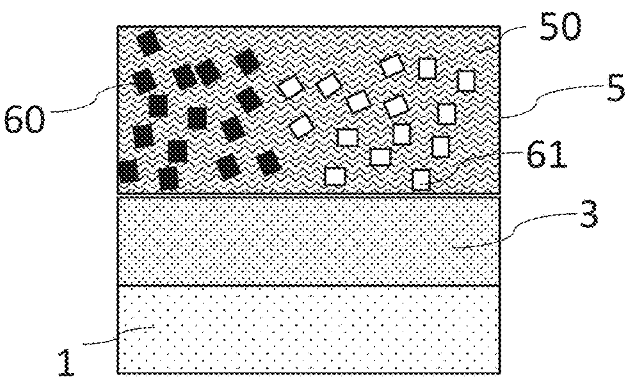
FIG. 3 shows a schematic representation of another embodiment of an appliance component according to the invention, wherein the coloring layer contains two different colorants.
Figure 4:
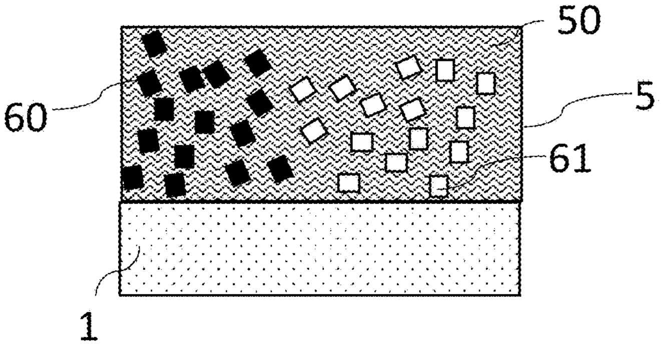
FIG. 4 shows a schematic representation of a comparative example without an adhesion promoter layer.

FIG. 3, in contrast, shows an exemplary embodiment in which the coloring layer 5 has two different colorants 60 and 61 in the excerpt shown. The comparative example shown in FIG. 4 is distinguished from the embodiment according to the invention shown in FIG. 3 by the fact that the comparative example does not have an adhesion promoter layer. The coloring layer 5 is thus applied directly onto the glass surface.

Figure 5:
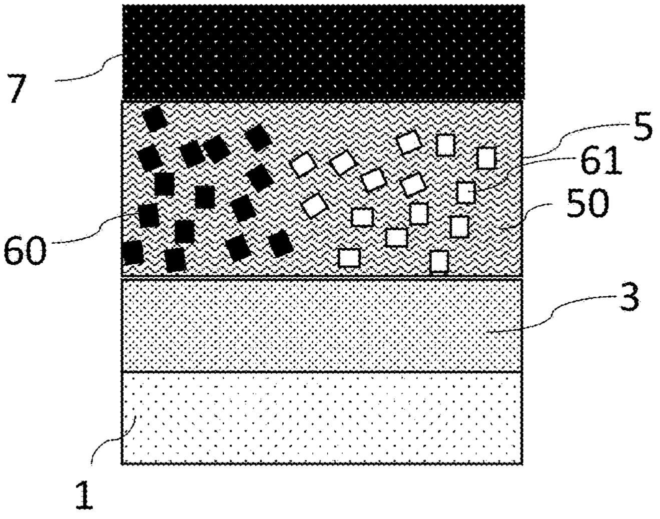
FIG. 5 shows a schematic representation of an exemplary embodiment of an appliance component according to the invention, the coating of which has an additional cover layer.

In FIG. 5, an embodiment of the invention is shown, in which a cover layer 7 is applied over the coloring layer 5.

Figure 6:
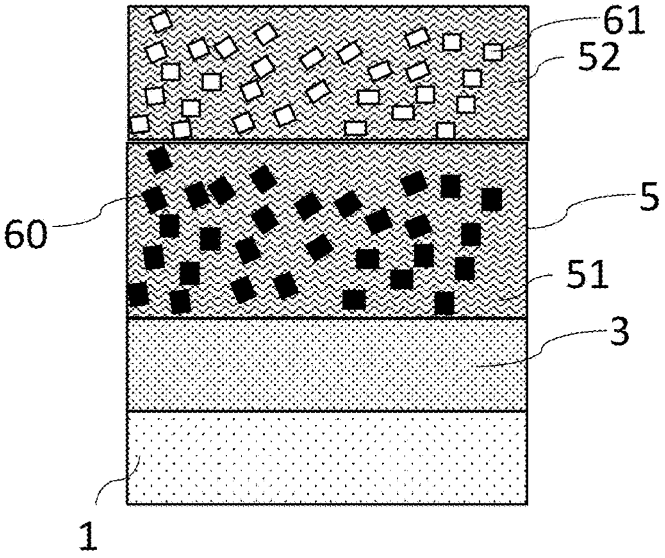
FIG. 6 shows a schematic representation of an exemplary embodiment, in which the coating comprises two coloring layers.

FIG. 6 shows an exemplary embodiment comprising two coloring layers 51 and 52. In this case, the second coloring layer was applied after the hardening of the first coloring layer 51. In the exemplary embodiment shown in FIG. 6, the two coloring layers 51 and 52 are distinguished by the colorants 60 and 61 contained in the excerpt shown.

Figure 7:
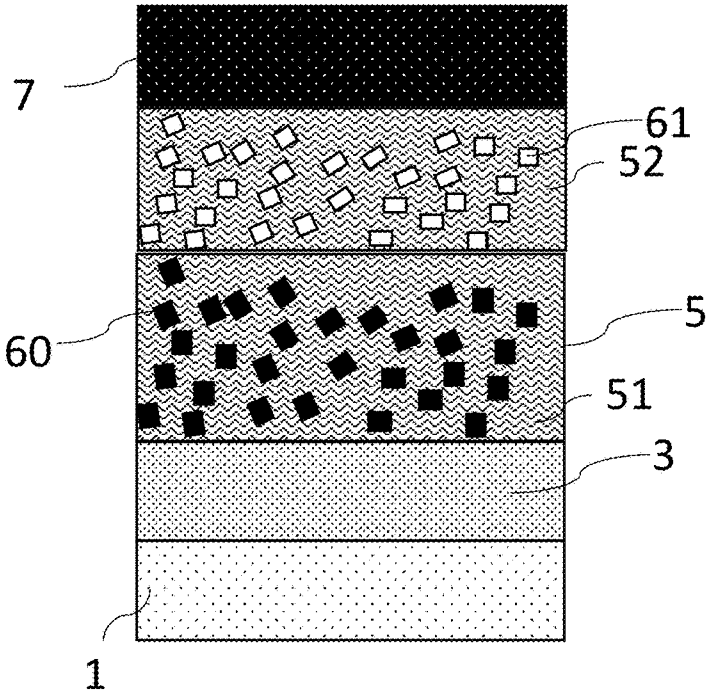
FIG. 7 shows a schematic representation of an exemplary embodiment, in which the coating comprises two coloring layers and a cover layer.

The embodiment shown in FIG. 7 essentially corresponds to the embodiment shown in FIG. 6. In addition, a cover layer 7 is arranged on the second coloring layer 52.

In order to determine the mechanical and chemical resistance of the appliance components according to the invention, the following samples were investigated.

Sample 1: Flat glass substrate with adhesion promoter layer and one coloring layer (see FIG. 3);

Sample 2: Glass substrate with adhesion promoter layer, a coloring layer and a cover layer (see FIG. 5).

Sample 3: Glass substrate with adhesion promoter layer, two coloring layers and a cover layer (see FIG. 7);

Sample 4: Comparative sample comprising a glass substrate and a coloring layer (see FIG. 4).

As the comparative example, sample 4 has no adhesion promoter layer. Here, the glass substrate was pretreated with a plasma method prior to the application of the coloring layer.

The scratch resistance of the coating, the stability of the coating relative to water and moisture, the temperature stability of the coating, as well as the chemical stability of the coating were determined.

To determine the adhesion of the coating, the samples were investigated according to the measurement standard ASTM D 3359. For this purpose, the samples were first left to stand for at least 24 hours after printing. Subsequently, a cross-cut grid test was conducted on the samples. For this purpose, a cross-cut grid made of 6 parallel cuts was introduced on the samples. Subsequently, an adhesive film was applied on the cross-cut grid, then pulled off, and the number of fields of the cross-cut grid in which the coating was detached was determined. The test was carried out 90 times for each sample. Table 1 shows the results of the cross-cut grid test.

TABLE 1

Results of the cross-cut grid test.

| | Percentage of the detached coating | Classification according to ASTM D 3359 |
|---|---|---|
| Sample 1 | 0.4% | 4B |
| Sample 2 | 1.9% | 4B |
| Sample 3 | 2% | 4B |
| Sample 4 | 75% | |

It is clear that for all investigated examples of embodiment of the invention, only a very small percentage of the coating is stripped off, and the coating thus displays a good adhesion to the glass surface. Thus, the detached percentage in the case of all samples is less than 5% in the cross-cut grid test. This is attributed to the adhesion promoter layer. Thus, in the cross-cut grid test of the comparative example (sample 4) without an adhesion promoter layer, a substantially higher percentage of the coating is detached.

The force required for delaminating the coating was determined with the aid of a scratching-tool Elcometer 3092 Sclerometer Hardness Tester with a round test tip made of tungsten carbide with a test tip radius of 1.0 mm (model designation KT003092P003) according to the measurement standard AS 3894.4. Here, 24 hours after the printing of the glass substrate, the tool was guided over a path of 10 mm at a constant speed over the surface of the samples, and the force required for the delamination of the coating was determined. The test was carried out three times for each sample. Table 2 compiles the results of the scratch test.

TABLE 2

Results of the scratch test

| Sample | Force required for delamination |
|---|---|
| Sample 1 | 3.5N to 5N |
| Sample 2 | 5N to 7N |
| Sample 3 | 14N to 16N |
| Sample 4 | <0.5N |

The samples according to the invention display here a very high scratch resistance, whereby the scratch resistance increases with increasing number of layers. We proceed from the fact that the cover layer and the coloring layers, in particular, contribute to the high scratch resistance based on their composition.

In order to determine the stability of the coatings against water, the samples were placed in water at a temperature of 20° C. for 24 hours. After a drying time of at least 24 hours, subsequently a cross-cut grid test, a test for determining the scratch resistance, as well as a visual inspection were conducted. Table 3 compiles the results of the tests.

TABLE 3

Test results after immersion in water

| Sample | Percentage of detached coating (cross-cut grid test) | Force required for delamination | Visual inspection |
|---|---|---|---|
| Sample 1 | <1% | 4.5 to 6N | No optical change |
| Sample 2 | <5% | 9.5 to 11N | No optical change |
| Sample 3 | 5% to 15% | 11.5 to 14N | Visible detachments at the edges of the coating |

TABLE 3-continued

| Test results after immersion in water | | | |
|---|---|---|---|
| Sample | Percentage of detached coating (cross-cut grid test) | Force required for delamination | Visual inspection |
| Sample 4 | >75% | <0.5N | Film almost completely detached as a layer |

It is clear that the coatings according to the invention also display good adhesion and scratch resistance even after immersion in water. The stability decreases in this case, after water immersion, with increasing number of coloring layers.

In addition, the stability of the samples against moisture was tested. In this case, the samples were exposed to an atmosphere with a relative air humidity of at least 95% at a temperature of 49° C. for 120° C. After a drying time of at least 24 hours, a test for determining the scratch resistance, a cross-cut grid test, as well as a visual inspection of the sample were conducted. Table 4 shows the respective test results.

TABLE 4

| Test results after placement in moist environment | | | |
|---|---|---|---|
| Sample | Percentage of detached coating (cross-cut grid test) | Force required for delamination | Visual inspection |
| Sample 1 | <5% | 4.5 to 7N | No optical change |
| Sample 2 | <22% | 9.5 to 11N | No optical change |
| Sample 3 | <30% | 14 to 14.5N | Partial regions appear transparent based on a partial detachment of the coating from the glass |
| Sample 4 | >75% | <0.5N | Film almost completely detached as a layer |

The temperature stability of the coating was tested by subjecting the samples to 10 temperature cycles, in which the samples were stored each time for one hour at 57° C. and one hour at −23° C. Subsequently, the adhesion and the scratch resistance of the samples were determined and an optical inspection was conducted. Table 5 compiles the results of the tests.

TABLE 5

| Test results after 10 temperature cycles | | | |
|---|---|---|---|
| Sample | Percentage of detached coating (cross-cut grid test) | Force required for delamination | Visual inspection |
| Sample 1 | <1% | 4.5 to 7.5N | No optical change |
| Sample 2 | 8.5% | 10.5 to 12.5N | No optical change |
| Sample 3 | 2% | 15.5N | No optical change |
| Sample 4 | >15% | <0.5N | No optical change |

In addition, the samples were subjected to permanently increased temperatures of 57° C., 65° C. and 74° C. for 7 days, and subsequently investigated for cracks in the coating. The results are shown in Table 6.

TABLE 6

| Temperature stability | | | |
|---|---|---|---|
| Sample | Stored at 57° C. | Stored at 65° C. | Stored at 74° C. |
| Sample 1 | No cracks | No cracks | Crack formation on the entire surface of the coating |
| Sample 2 | No cracks | No cracks | No cracks |
| Sample 3 | No cracks | No cracks | Cracks in the edge regions of the coating |
| Sample 4 | No cracks | No cracks | No cracks |

All examples of embodiment display a high temperature resistance. Cracks thus first occur at temperatures above 65° C. In this case, the crack formation may be attributed to different thermal expansion coefficients of the adhesion promoter layer and the coloring layers.

In order to determine the chemical resistance of the samples, the chemicals or substances listed in Table 7 were applied onto the surface of the coating, the samples were then stored at room temperature for six cycles for up to 7 hours, and subsequently the optical change of the samples was evaluated. Here, the evaluation of the visual changes of the samples was conducted according to the following grading:

0—no optical changes, such as visually recognizable shadows or spots

1—slight optical changes that can be recognized depending on the angle of observation 2—optical changes also recognizable under various angles of observation 3—clear changes that can be recognized independently from the particular angle of observation In this case, the chemical stability of one sample 1 with different colorants in the coloring layer was tested. Table 7 compiles the results of the test with different print colors.

TABLE 7

| Chemical stability | | | | | | | |
|---|---|---|---|---|---|---|---|
| Substance | Cyan | Magenta | Yellow | Black | White | Clear (no color) | Average |
| Lemon | 0 | 0 | 0 | 0 | 0 | 0 | 0 |
| Vinegar | 2 | 1 | 1 | 2 | 1 | 0 | 1 |
| Window cleaner | 0 | 0 | 1 | 0 | 0 | 0 | 0 |
| Ketchup | 0 | 0 | 0 | 0 | 1 | 0 | 0 |
| Mustard | 0 | 1 | 0 | 0 | 0 | 0 | 0 |
| Scouring agent | 1 | 1 | 0 | 2 | 1 | 0 | 1 |
| Household cleaner | 1 | 1 | 1 | 1 | 1 | 0 | 1 |
| Drain cleaner | 3 | 3 | 3 | 3 | 3 | 3 | 3 |

As can be recognized from Table 7, the coloring layer has a high chemical stability against a plurality of substances. Slight optical changes occur in the case of vinegar scouring agent, as well as for household cleaner. Here, the extent of optical visibility of the changes is mainly influenced by the particular print colors. Thus, in a clear layer without colorant, the changes are less striking. In all cases, drain cleaner leads to strong optical changes.

Figure 8:
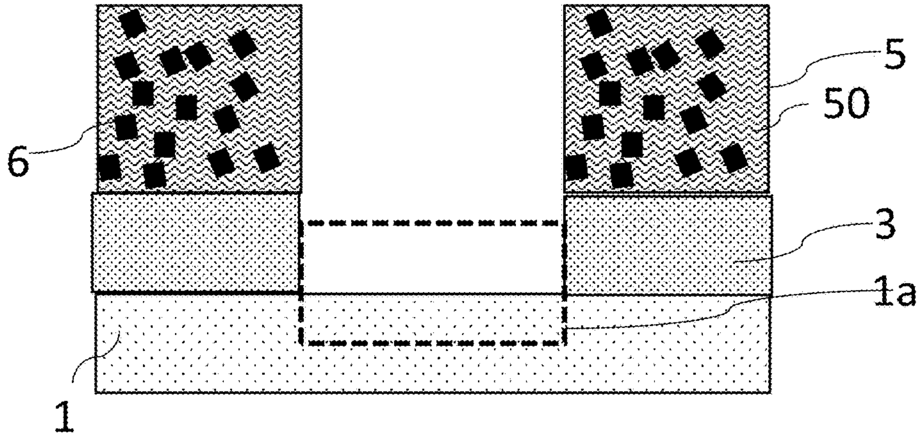
FIG. 8 shows a schematic representation of an exemplary embodiment with a laterally structured coating.

FIG. 8 shows a schematic representation of an embodiment, in which the coating is applied laterally structured onto the side face of the glass substrate 1, i.e., partial regions 1*a* of the glass surface of the operational back side have neither an adhesion promoter layer 3 nor a coloring layer 5.

Figure 9:
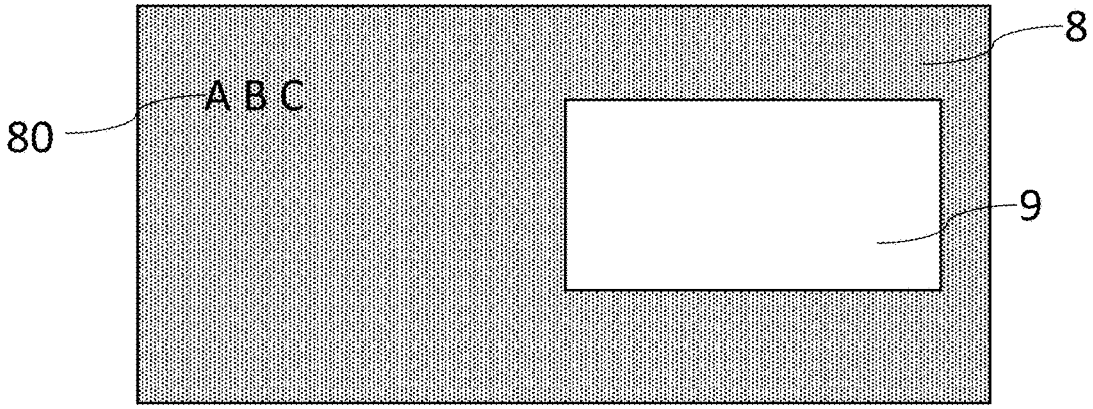
FIG. 9 shows a schematic representation of an embodiment of an appliance component according to the invention in top view.

FIG. 9 shows a view of an appliance component that has the uncoated partial regions 9. These partial regions 9 can be formed, for example, as windows for indications or displays. The coating 8 can additionally also comprise regions 80 with decorative logos, illustrations, and/or symbols such as letters or numbers.

Figure 10:
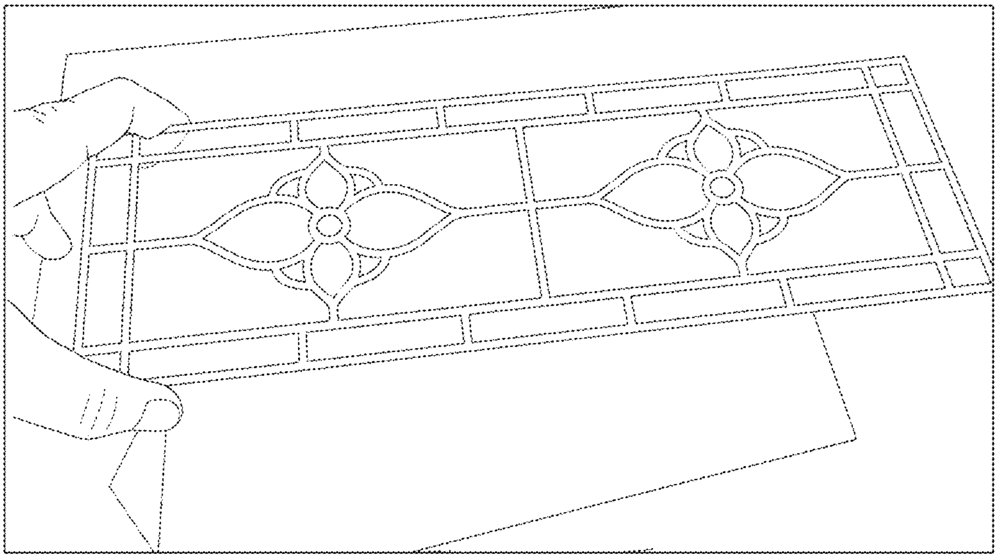
FIG. 10 shows a photograph of a coated appliance component according to the invention in the form of a decorative panel.

FIG. 10 shows a photograph of an appliance component according to the invention.

Figure 11:
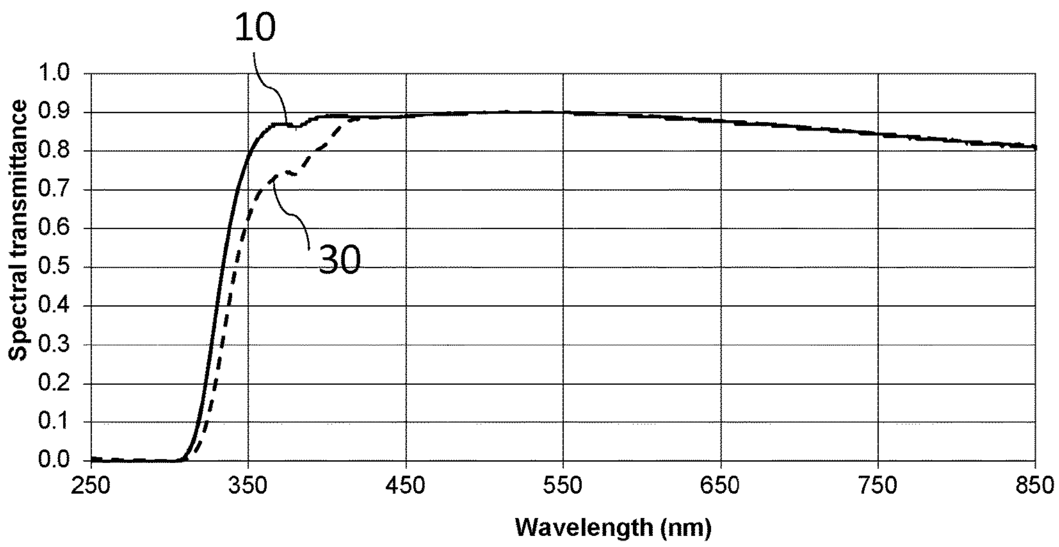
FIG. 11 shows the transmittance of a glass substrate coated with an adhesion promoter layer according to the invention and of an uncoated glass substrate for comparison.

FIG. 11 shows the representation of the transmittance curves of a glass substrate 30 coated with an adhesion promoter layer according to the invention, as well as of an uncoated glass substrate 10 as a reference sample. The adhesion promoter layer here has a thickness of 3.8 μm. From FIG. 11 it can be seen that the transmittance experiences only a very slight change due to the adhesion promoter layer. Here, particularly for the smaller wavelengths in the VIS range, the adhesion promoter layer leads to a reduction in the transmittance, whereas the transmittance at the higher wavelengths in the VIS range is not influenced or almost not influenced. This transmittance behavior of the adhesion promoter layer at different wavelengths also leads to the fact that the shift of color coordinates ΔE is dependent on the particular wavelength. Table 8 shows the results here of the shift of color coordinates in the case of various print colors.

TABLE 8

Results of the lab measurement

| | Adhesion promoter layer on glass substrate | | | Glass substrate | | | |
|---|---|---|---|---|---|---|---|
| Color | L | a | b | L | a | b | ΔE |
| Blue | 27.35 | 14.77 | −29.51 | 26.52 | 10.12 | −21.72 | 9.11 |
| Green | 47.9 | −66.03 | 20.18 | 46.61 | −63.28 | 18.88 | 3.3 |
| Red | 41.78 | 48.2 | 25.73 | 41.44 | 48.58 | 25.72 | 0.51 |
| Black | 38.01 | 1.15 | 4.95 | 33.33 | 1.96 | 6.35 | 4.95 |
| Yellow | 81.02 | −10.997 | 70.72 | 81.99 | −11.28 | 75.82 | 5.2 |
| Magenta | 43.23 | 57.47 | −13.57 | 43.01 | 57.12 | −10.77 | 2.83 |
| Cyan blue | 55.28 | −38.71 | −35.97 | 54 | −38.54 | −35.02 | 1.6 |

The measurement values listed in Table 8 were determined by lab measurements according to the standard ASTM E-1164 with a spectrophotometer of the kind Konica Minolta cm-700 d. Here, first of all, an adhesion promoter layer according to the invention was applied onto a soda-lime glass, wherein the layer thickness of the adhesion promoter layer amounted to 5 μm+/−1 μm. A coloring layer that had discrete regions with the colors listed in Table 8 was applied onto the adhesion promoter layer. The thus-printed substrate was placed with the coated side onto a white sheet of paper and the color coordinates of the individual colors were determined in the lab system from the uncoated side of the glass substrate. As the reference sample, a glass substrate without an adhesion promoter layer, but with a corresponding coloring layer was provided, and the color coordinates of the individual print colors were determined. The shift of color coordinates ΔE results from the difference between the particular color coordinates of the sample with the adhesion promoter layer and the reference sample. The shift of color coordinates ΔE thus shows the influence of the adhesion promoter layer on the color coordinates of a print color of the coloring layer by the user. It is clear here that the shift of color coordinates through the adhesion promoter layer in the case of blue color hues is clearly greater than in the case of red color hues. In particular, with a view from the glass side, blue color hues appear as yellowish to the user.

What is claimed is:

1. An appliance component, comprising:

a glass substrate having an operational front side that faces a user and an operational back side that faces an inside of the appliance, the glass substrate being made of thermally tempered flat glass;

a coating only on the operational back side, wherein the coating comprises at least two coatings, wherein the at least two coatings comprise an intrinsically colored adhesion promoting layer adjacent to the operational back side and an organic color layer applied to the adhesion promoting layer, wherein the organic color layer is a digitally printed layer having a polymer matrix and a colorant;

wherein the adhesion promoting layer comprises a polymer matrix with functional groups for bonding to the glass substrate, and wherein the adhesion promoting layer is between the glass substrate and the organic color layer;

wherein the adhesion promoting layer has a transmittance of at least 80% for a light wavelength range between 380-780 nm at a layer thickness in a range of between 1-5 μm, and wherein the organic color layer is viewable through the adhesion promotor layer and through the glass substrate, from the operational front side of the glass substrate with a mean color coordinate shift ΔE caused by the adhesion promoting layer that is <15 for a color blue, is <5 for a color red, and is <6 for a color green, and wherein:

(a) the adhesion promoting layer comprises a copolymer containing the following monomer units:

Ia

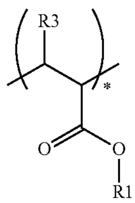

-continued

IIa

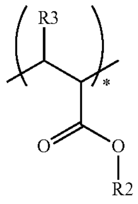

IIIa

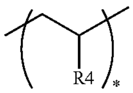

wherein R1 is an aromatic residue, R2 is an aliphatic residue or an aliphatic acid, R3 is hydrogen or a methyl group, and R4 is an aliphatic or aromatic residue;

or (b) the polymer matrix of the adhesion promoter promoting layer is crosslinked by Si—O—Si bonds and carbon-carbon bonds.

2. The appliance component of claim 1, wherein the glass substrate is selected from a group consisting of a substrate having a thickness of at least 2.5 mm, a substrate having a thickness in a range of 3 to 8 mm, and a substrate having a thickness in a range of 3.5 to 5.5 mm.

3. The appliance component of claim 1, wherein the polymer matrix of the adhesion promoting layer is formed from monomer units of at least one monomer with radically polymerizable groups.

4. The appliance component of claim 1, wherein the polymer matrix of the organic color layer comprises a crosslinked polyacrylic matrix and at least one organic colorant.

5. The appliance component of claim 1, wherein the organic color layer comprises at least one light stabilizer comprising a constituent selected from the group consisting of HALS, piperidine derivatives, and organic aromatic compounds with extended π-systems.

6. The appliance component of claim 1, wherein the organic color layer is a single layer having a force required for delamination from the glass substrate of 3.5 to 5 N.

7. The appliance component of claim 1, wherein the organic color layer comprises two layers and that the coating has a force required for delamination from the glass substrate of 5 to 7 N.

8. The appliance component of claim 1, wherein the organic color layer comprises three layers and that the coating has a force required for delamination from the glass substrate of 14 to 16 N.

9. The appliance component of claim 1, wherein the coating further comprises an opaque cover layer arranged on the organic color layer.

10. The appliance component of claim 1, wherein the glass substrate is a soda-lime glass substrate.

11. The appliance component of claim 1, wherein the polymer matrix of the adhesion promoting layer comprises silanes with polymerizable groups, and silsesquioxanes with polymerizable groups.

12. The appliance component of claim 1, wherein the polymer matrix of the adhesion promoting layer comprises pre-hydrolysates of silanes with polymerizable groups as monomer units.

13. The appliance component of claim 1, wherein the polymer matrix of the adhesion promoting layer comprises trialkoxysilanes containing an acrylic or vinyl group.

* * * * *